March 28, 1967 S. DUINKER ETAL 3,311,781

CIRCUIT COMPRISING WRITING AND REPRODUCING CIRCUITS USING ELECTROLUMINESCENT AND FERROELECTRIC CELLS

Filed Sept. 29, 1960 2 Sheets-Sheet 1

INVENTOR
Simon Duinker
Edward F. de Haan
Gesinus Diemer
Johannes G. van Santen
BY
AGENT INVENTOR
Simon Duinker
Edward F. de Haan
Gesinus Diemer
Johannes G. van Santen
BY
Frank R. Trifari
AGENT United States Patent Office 3,311,781

Patented Mar. 28, 1967

3,311,781

CIRCUIT COMPRISING WRITING AND REPRODUCING CIRCUITS USING ELECTROLUMINESCENT AND FERROELECTRIC CELLS

Simon Duinker, Edward Fokko de Haan, Gesinus Diemer, and Johannes Gerrit van Santen, all of Eindhoven, Netherlands, assignors to North American Philips Company, Inc., New York, N.Y., a corporation of Delaware Filed Sept. 29, 1960, Ser. No. 59,254

Claims priority, application Netherlands, Oct. 2, 1959, 243,983

9 Claims. (Cl. 315—173)

The invention relates to a circuit arrangement comprising at least one writing circuit and at least one reading circuit. The writing circuit consists of a source supplying a pulsatory signal and of a storage element in the form of a capacitor having an impedance that varies as a function of the information supplied thereto from the said source and subsequently stored therein. The reading circuit consists of a continuously operative alternating-voltage source and a reproducing element also formed by a capacitor. The voltage across the reproducing element, either directly, in the case of a series combination of the storage and reproducing elements, or indirectly in the case of a parallel combination of the two elements, with the interposition of a series capacitor, is a function of the impedance of the storage element.

Such an arrangement is described in United States Patents No. 2,917,667 and No. 2,888,593. Herein an arrangement is described which comprises a plurality of writing circuits and reading circuits. The storage elements are formed by bariumtitanate cells, and the image information is supplied thereto via a switch. Since the switch connects the image information source in order of succession to the bariumtitanate cells, transfer pulses are supplied to these cells. The amplitude of these pulses is a measure of the quantity of information to be stored in the storage element. The duration of these pulses is short with respect to one period of the alternating voltage supplied by the alternating-voltage source. A direct voltage is supplied to the bariumtitanate element for the duration of such a pulse to vary the value of the dielectric constant of this element in accordance with the value of the direct voltage. Since the alternating voltage or the alternating-current source is continuously operative, the instantaneous value of this alternating voltage or alternating current may have any amplitude and/or polarity for the duration of a pulse supplied to the storage element. This means that the said instantaneous value, added to the amplitude of the pulse, determines the average value about which the alternating voltage across the storage element fluctuates after the pulse has been supplied.

This problem becomes more pronounced as the period of the singal supplied by the alternating-voltage source increases with respect to the duration of a pulse supplied by the information source. A longer period means a lower frequency and this is desirable. If a large number of storage elements and reproducing elements are assembled on a small surface, it is much simpler to avoid radiation from the reading circuits to the writing circuits in the case of low frequencies than in the case of high frequencies. If the reproducing elements are made from activated zinc sulphide, the activating frequency is allowed to be at the most 15 kc./s. With this frequency the duration of one pulse is short relative to one period of the activating alternating voltage.

It follows therefrom, as will be explained more fully hereinafter, that in accordance with the instant of the pulse supply a different effective value of the dielectric constant is adjusted. This is not desirable, since reading is then influenced by the instant of the pulse supply.

In order to avoid this disadvantage it is proposed in Patent No. 2,917,667 to supply the pulses not directly but via a resistor-capacitor network to the storage element. The charge supplied to the capacitor is in this case a measure of the quantity of information to be finally stored in the bariumtitanate element. The said charge leaks slowly into this bariumtitanate element by way of the resistor. In reproducing panels, such as disclosed in United States Patent 3,163,851, wherein a large number of storage elements are used and all these storage elements receive different information, this means the addition of a great number of resistors and capacitors.

An object of the invention is to obviate this disadvantage without the addition of further elements and to this end the circuit arrangement according to the invention is characterized in that the frequency of the signal supplied by the alternating-voltage source is equal to or is a whole multiple of the repetition frequency of the pulsatory signal. In order to maintain a constant phase difference between the two signals the two sources are connected to each other by a coupling device.

A few embodiments of circuit arrangements according to the invention will now be described by way of example with reference to the accompanying drawings in which.

Figure 3:
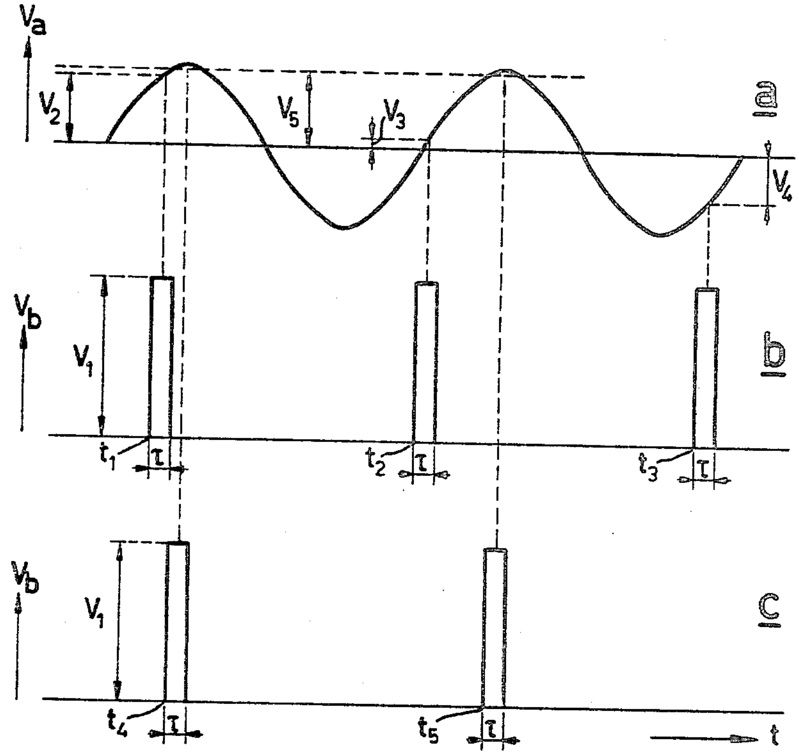
Figure 4:
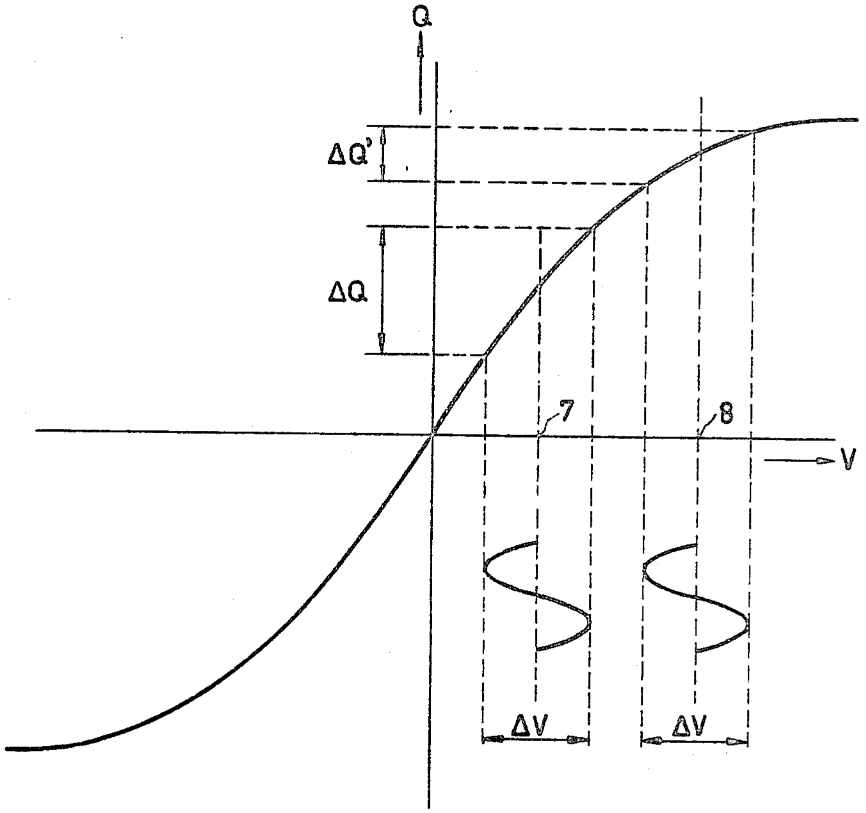

FIG. 3*a* shows the A.C. voltage as supplied by a source for delivering the desired power to the reading circuit;

FIG. 3*b* shows the voltages as delivered by an information source for the writing circuit at arbitrary moments;

FIG. 3*c* shows the voltages as delivered by an information source for the writing circuit at moments in accordance with the invention; and FIG. 4 shows a charge-voltage characteristic curve for the storage element.

Figures 1, 2:
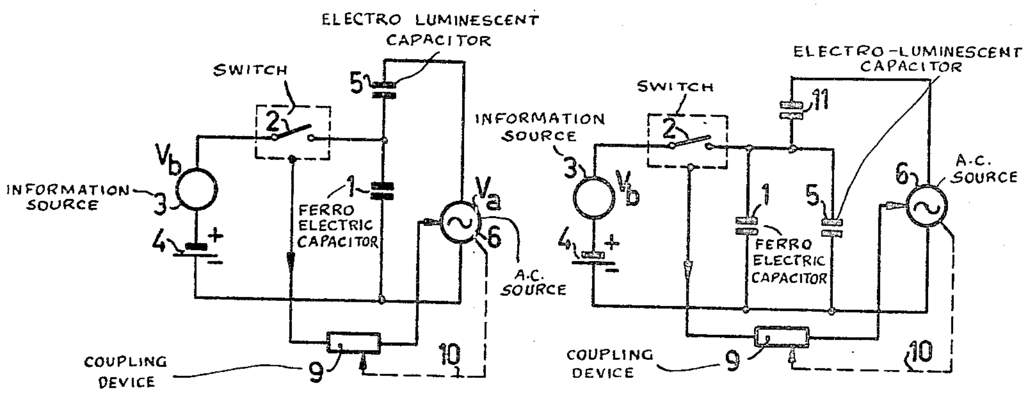
FIG. 1 is a circuit diagram of a first embodiment of the invention in which the reading element is in series with the writing circuit.
FIG. 2 is a circuit diagram of a modified form of the invention in which the reading element is in parallel with the writing circuit.

Referring now to FIG. 1, reference numeral 1 designates a storage element, which is included in the writing circuit via the switch 2 the information source 3 and the battery 4. This storage element 1 is, moreover, included in the reading-circuit via the reading-element 5 and the alternating-voltage source 6.

For the case under consideration the storage element is represented by a capacitor, in which the dielectric is comprised of a material having ferro-electric properties, for example a mixture of bariumtitanate and strontiumtitanate $(BaTiO_3)_x.(SrTiO_3)_{1-x}$. At room temperature $x=80\%$, which means that at this temperature 80% of the mixture consists of bariumtitanate and 20% of strontiumtitanate. The same applies to the reading element 5, in which the dielectric is comprised of a material having electro-luminescence properties, for example, a zinc sulphide ($Z_nS$) compound, activated with $10^{-3}$ copper (Cu) atoms and $10^{-3}$ aluminium (Al) atoms per molecule zinc sulphide. When such reading-out elements are arranged in a television reproducing panel, a great number of series combinations of reading elements 5 and storage elements 1 are connected in parallel, and different information can be supplied from the associated source 3 to each storage element 1. Such sources 3 may be, for example, a so-called cross-bar system, consisting of two groups of spaced parallel conductors, the conductors of one group being at right angles to those of the other group. The switch 2 may be a diode, which is released as soon as the associated crossing of the conductors obtains the voltage required for the element 5.

It is known that the ferro-electric material provided between the coatings of the storage element has the property of a decreasing dielectric constant at an increasing field intensity. This means at an increasing voltage across the capacitor the capacity value thereof decreases and hence its impedance increases.

Consequently, when the amplitude of the pulse supplied by the combination of the source 3 and the switch 2 increases at a given instant, the capacity value of the storage element 1 decreases, so that a larger part of the alternating voltage supplied by the source 6 will be operative across the storage element 1 and a smaller part across the reading element 5, the latter thus having a lower light output than in the initial state. It should be noted here that when controlling by means of an alternating-voltage source, a black image element corresponds to a large amplitude and a white image element to a small amplitude of the signal supplied by the source 3.

If the amplitude of the voltage supplied by the source 3 is chosen to be high with respect to the amplitude of the alternating voltage supplied by the source 6, the voltage across the element 1, subsequent to the opening of the switch 2, will not be substantially influenced by the opening and closing instants of this switch.

However, if the amplitude of the voltage supplied by the source 6 is increased with a constant amplitude of the voltage supplied by the source 3, two effects result:

(1) The amplitude of the voltage drop across the reproducing element 5 will increase so that the effective light output of this element increases;

(2) The control of the element 1 is influenced by the average value of the alternating voltage supplied by the source 6 for the time in which the switch 2 is closed.

The first consequence is desired, since a higher light output is desirable, but the second consequence is not desired.

In order to account for the second consequence and the adverse influence thereof, FIG. 3*a* illustrates the alternating voltage supplied by the source 6 and FIG. 3*b* illustrates the pulses supplied to the element 1 by the combined operation of the source 3 and the switch 2, the switching frequency of the switch 2 being chosen at will.

At the instant $t_1$ the switch 2 is closed for the time $\tau$ sec. in which the source 3 supplies a voltage $+V_1$ volts to the storage element. For this time the alternating voltage $V_a$ has a mean value of $+V_2$ volts, so that, when on a first approximation a variation in the capacity value of the capacitor 1 is not considered, after the first switching action the said capacitor has a charge $Q_1=C_1V_1$ coulombs and capacitor 5 a charge of $Q_5=C_5.(V_1-V_2)$ coulombs, wherein $C_1$ and $C_5$ designate the capacity values in farads of the capacitors 1 and 5.

After the switch 2 has been opened, the alternating-voltage source 6 starts circulating a charge in the circuit, and owing to the initial value of $Q_5$ coulombs the mean value about which the alternating voltage across the capacitor 1 will fluctuate will be equal to $$\left(V_1-\frac{C_5}{C_1+C_5}\cdot V_3\right)\text{ volts}$$

If the next-following closure of the switch 2 occurs at the instant $t_2$, the mean value of the alternating voltage $V_a$ is equal to $+V_3$ volts and the mean value about which the alternating voltage across the capacitor 1 will fluctuate after the opening of the switch 2 is equal to $$\left(V_1-\frac{C_5}{C_1+C_5}\cdot V_3\right)\text{ volts}$$

After the opening of the switch 2 at the instant $t_3+\tau$ with an associated contribution of $-V_4$ volts of the alternating voltage $V_a$ during the closure of the switch 2, this mean value is given by:

$$\left(V_1+\frac{C_5}{C_1+C_5}\cdot V_4\right)\text{ volts}$$

From the foregoing it follows that, if the instant of closing of the switch 2 varies, the mean value of the sinusoidal alternating voltage across the capacitor 1 also varies.

However, the capacitor 1 does not exhibit a constant capacity value. This capacity value depends upon the preliminary process and upon the range in which the capacitor 1 is driven.

This is illustrated in FIG. 4, in which the charge variation Q is plotted as a function of the applied voltage V for a capacitor with bariumtitanate dielectric. The hysteresis loop is assumed to be infinitely narrow, since the hysteresis phenomenon observable with such ferro-electric materials is insignificant for the effects under consideration.

It is assumed that the voltage associated with point 7 is equal to $$\left(V_1-\frac{C_5}{C_1+C_5}\cdot V_2\right)\text{ volts}$$

This is the mean value about which the alternating voltage across the capacitor 1 will fluctuate when the switch is closed at the instant $t_1$ and is reopened at the instant $t_1+\tau$. If the amplitude of the alternating voltage across the capacitor 1 is equal to $\Delta V/2$, this is associated with a charge variation of $\Delta Q$. The capacity value after this first switching operation is therefore equal to:

$$C_{1(t_1)}=\frac{\Delta Q}{\Delta V}$$

The charge variations after the closure at the instant $t_2$ are, for the sake of clarity, not illustrated in the figure, however, those after the closure at the instant $t_3$ are shown. The voltage at point 8 therefore corresponds to $$\left(V_1+\frac{C_5}{C_1+C_5}\cdot V_4\right)\text{ volts}$$

and the associated charge variation, with the same amplitude of the alternating voltage, is $\Delta Q^1$.

After the instant $t_3+\tau$, the capacity value therefore becomes $$C_1(t_3)=\frac{\Delta Q^1}{\Delta V}$$

Since $\Delta Q^1<\Delta Q$, this means that $C_{1(t_3)}<C_{1(t_1)}$ so that the closure at different instants results in different capacity values despite equal values of $V_1$. The capacity value of the capacitor 1, at a closure of the switch 2 at the instant $t_2$, lies, as a matter of fact, between that at a closure at the instants $t_1$ and $t_3$.

With a constant amplitude of the alternating voltage supplied by the source 6, the voltage drop across the capacitor 1 will even increase slightly at a decreasing capacity value of this capacitor, so that the effect is even slightly improved as compared with the result of the formulae given above.

Therefore it may be concluded that, if switching on takes place at arbitrary instants, despite a constant information from the source 3, the capacity value of the capacitor 1 varies, so that the alternating voltage across the capacitor 5 will also vary. This means that, by switching on at arbitrary instants, the light output of the reading element varies so that undue interference phenomena in the form of brightness variations occur. If the switching frequency of the switch 2 would, for example, be 25 c./s. and that of the alternating voltage 24 c./s., there had to pass 25 cycles of the alternating voltage and 24 of the switching frequency before the same instantaneous value of the alternating voltage would occur at the closure of the switch 2. At 25 images per second this means substantially 24 brightness variations per second. Such variation is visible to the eye, since the eye is not capable of integrating such slow variations.

On the basis of the above discussion it will be obvious that the obviation of the aforesaid disadvantage is not the addition of further resistors and capacitors, but that in accordance with the idea of the invention, the frequency of the alternating voltage supplied by the source 6 must be equal to or a whole multiple of the switching frequency of the switch 2. Moreover, via the coupling device 9 the alternating voltage source 6 is coupled with the switch 2, so that the switching signal governing the closure and opening of the switch 2 is coupled in rigid phase relation with the alternating voltage supplied by the source 6. This is illustrated in FIG. 3*c*, wherein the period of the switching pulses is chosen to be equal to the period of the alternating voltage illustrated in FIG. 3*a*. Moreover, the pulses always coincide with the maxima of the alternating voltage. It follows therefrom that the mean value of the alternating voltage after the closure of the switch 2 at the instants $t_4$ and $t_5$ is always $+V_5$ volts, so that the same capacity value will always be obtained. Undue brightness variations therefore do not occur.

The instants $t_4$ and $t_5$ are chosen only by way of example and it will be evident that the instants of closure of the switch 2 may occur also always immediately before the zero positions of the sinusoidal voltage. In this case the alternating voltage across the capacitor 1 fluctuates only about the mean value $V_1$, so that the capacity value effectively adjusted is exclusively determined by the voltage obtained from the source 3. The same result may be obtained by adapting the voltage supplied by the source 3 to the instant of closing. This is achieved by adding the battery 4. If, for example, at the instants $t_4$ and $t_5$ indicated in FIG. 3*c* the switch is closed, the mean value of the alternating voltage across the capacitor 1 is equal to:

$$\left(V_1-\frac{C_5}{C_1+C_5}\cdot V\right)\text{ volts}$$

if $+_5$ is the average contribution of the alternating voltage for the closing time $\tau$ of the switch 2. By taking a voltage of $$\frac{C_5}{C_1+C_5}\cdot V_5\text{ volts}$$

from the battery 4, the alternating voltage fluctuates only about the mean value $V_1$.

Other combinations of closing instants and supplied voltages may also be adjusted in accordance with the working point to be chosen on the curve shown in FIG. 4. This working point will shift in place as a function of the voltage supplied by the source 3, which may form, for example, the video information for an image to be reproduced by means of the reproducing elements 5. The requirement is in this case that a maximum contrast variation should occur at a minimum variation of the voltage supplied by the source 3.

It should furthermore be noted that the frequency of the alternating voltage in most cases will be a multiple of the switching frequency. For example, with a television reproducing panel adapted to a non-interlaced 625 line system with 25 images per second the switching frequency will be 25 c./s., an alternating voltage of 25 c./s. is much too low for a continuous activation of the reproducing panel. In this case the latter could be, for example, equal to the line frequency of 15625 c./s., so that the first condition is fulfilled. If the switching frequency is derived from the image synchronizing pulses and the alternating voltage is also derived from this image synchronization via a multiplication circuit, the condition of the rigid phase relationship is also fulfilled. The device 9 is in this case either a multiplying circuit or a control-circuit, which governs both the switch 2 and the source 6.

The multiplying circuit, however, may also serve, if as is shown in FIG. 3 the multiplication factor is equal to 1, so that the switching frequency is equal to the frequency of the alternating voltage. In this case the generator 6 may be an amplifier and the coupling device 9 may be a tuned circuit, provided or not provided with a pre-amplifier, to which the pulses are fed. There is even the possibility of combining the coupling device 9 and the generator 6, if the amplitude of the alternating voltage need not be excessively high.

If the multiplication factor exceeds 1, a high amplification will, as a rule, be required, since the amplitude of the voltage supplied by the coupling device 9 with the specially adjusted pre-amplifier and a circuit tuned to the higher harmonics of the switching frequency will be too low to be supplied without further amplification to the series combination of the elements 5 and 1.

The source 6 may furthermore be an oscillator, which produces an oscillation of the desired frequency and amplitude and which is directly synchronized by the pulses supplied via the coupling device. In the latter case the device 9 may also be a phase discriminator in which the switching signal from the switch 2 and the oscillator signal fed back via the conductor 10 are compared with each other. The control-voltage supplied by device 9 adjusts the oscillator 6 to the correct frequency and the correct phase.

The source 6 need not supply a sinusoidal alternating voltage.

Any waveform of the alternating voltage suitable for the activation of the reading element 5 may be employed.

If no use is made of a combination of a source 3 and a switch 2 but if pulsatory voltages are supplied to the storage element 1 directly from a source, these pulses may be fed directly for control or synchronizing purposes to the source 6.

As is shown in FIG. 2, in which the parts corresponding with those shown in FIG. 1 are designated by the same reference numerals, the element 5 and 1 are not connected in series but in parallel and a series capacitor 11 is connected between the parallel combination and the source 6. The impedance of the capacitor 11 is high with respect to the maximum impedance of the said parallel combination. The combination of the capacitor 11 and the source 6 may therefore be considered as a current source, and the charge supplied to the capacitor 11 could vary, if the instants of closing of the switch 2 were chosen at will.

The impedance of element 1 will vary as a function of the information fed to the element 1 by the source 3. Since the impedance of the reading element 5 remains substantially constant, the voltage across the parallel combination will vary as a function of the impedance variation of the element 1, so that the element 5 will emit more light as the impedance of the element 1 increases. The capacity value of the capacitor 1 decreases at an increasing value of the voltage supplied by the source 3, so that the impedance thereof increases. It follows therefrom that with this current source control a black image element corresponds to a small signal and a white image element to a great signal, so that no reversal of the image signal is required as is the case with voltage source control.

The storage element 1 may be any element having storing properties which may be varied by a separately supplied writing voltage. Such an element is, for example, a germanium diode or a silicon diode, driven in the blocking direction. A diode thus driven has the property that its capacity value decreases with an increasing voltage applied thereto.

The use of writing circuits and reading circuits with a continuously operative alternating-voltage source or alternating-current source need not be restricted to a television reproducing panel. These arrangements may also be employed in computers, in which the information is introduced for each element and is available for reading at any instant. The elements 5 may, for example, be capable of reproducing given digits continuously or not continuously depending upon whether the information is fed to the associated storage element or not.

What is claimed is:

1. An information writing and reproducing circuit comprising a source of pulsatory information signals, a source of an alternating voltage having a frequency that is integrally related to and at least as great as the repetition frequency of said information signals, first and second capacitor means, means connected to apply said alternating voltage to said first and second capacitor means whereby the voltage across said second capacitor means is dependent upon the capacity of said first capacitor means, means applying said signals to said first capacitor means, said first capacitor means having an impedance which varies as a function of the magnitude of said signals, and coupling circuit means connected between said source of pulsatory signals and said source of alternating voltage for maintaining a substantially constant phase relationship between said pulsatory signal and alternating voltage.

2. The circuit of claim 1, in which said second capacitor means is a capacitor having an electro-luminescent dielectric.

3. An information writing and reproducing circuit comprising a source of pulsatory information signals, a source of an alternating voltage having a frequency that is integrally related to and at least as great as the repetition frequency of said information signals, first capacitor means, said first capacitor means having a voltage dependent impedance, means applying said signals to said first capacitor means, a reproducing element comprising second capacitor means, means connected to apply said alternating voltage to said first and second capacitor means whereby the voltage across said second capacitor means is a function of the capacity of said second capacitor, and coupling circuit means connected between said source of signals and source of alternating voltage for maintaining a substantially constant phase relationship between said pulsatory signal and alternating voltage.

4. The circuit of claim 3, wherein said first and second capacitors are serially connected to said source of alternating voltage.

5. The circuit of claim 3, comprising means for connecting said first and second capacitor means in parallel, and series capacitor means for applying said alternating voltage to said first and second capacitor means.

6. An information display system comprising a source of pulsatory information signals, a source of alternating voltage having a frequency that is integrally related to and at least equal to the repetition frequency of said information signals, a first capacitor having a voltage dependent impedance, a second capacitor having an electroluminescent dielectric, a source of a direct voltage, means applying said direct voltage and information signals serially to said first capacitor, means interconnecting said first and second capacitors and source of alternating voltage whereby the alternating voltage across said second capacitor is dependent upon the impedance of said first capacitor, and coupling means connected between said source of signals and said source of alternating voltage for maintaining a substantially constant phase relationship between said pulsatory signal and said alternating voltage.

7. The system of claim 6, in which said direct voltage has a magnitude substantially equal to the average contribution of said alternating voltage across said first capacitor during the time a pulse from said source of signals is applied to said first capacitor.

8. The system of claim 6, in which said source of alternating voltage is an oscillator, and said coupling means comprises means for synchronizing said oscillator from said pulsatory signals.

9. The system of claim 6, in which said source of alternating voltage is an amplifier, and said coupling means comprises frequency multiplying means for multiplying the frequency of said signals.

References Cited by the Examiner

UNITED STATES PATENTS

| | | | |
|---|---|---|---|
| 2,875,380 | 2/1959 | Toulon | 315—169 |
| 2,888,593 | 5/1959 | Anderson | 313—108.1 |
| 2,917,667 | 12/1959 | Sack | 315—169 |
| 2,928,894 | 3/1960 | Rajchman | 178—7.3 |
| 2,972,692 | 2/1961 | Thornton | 313—108.1 |

OTHER REFERENCES

"ELF—A New Electroluminescent Display," by E. A. Sack, Proceedings of IRE, pages 1694 to 1699, October 1958.

JAMES W. LAWRENCE, *Primary Examiner.*

STEPHEN W. CAPELL, GEORGE WESTBY, E. JAMES SAX, *Examiners.*

C. R. CAMPBELL, M. GINSBURG, *Assistant Examiners.*